May 11, 1943. C. C. ROUMAGE ET AL 2,318,971
SKI RACK FOR MOTOR VEHICLES
Filed April 13, 1940 2 Sheets-Sheet 1
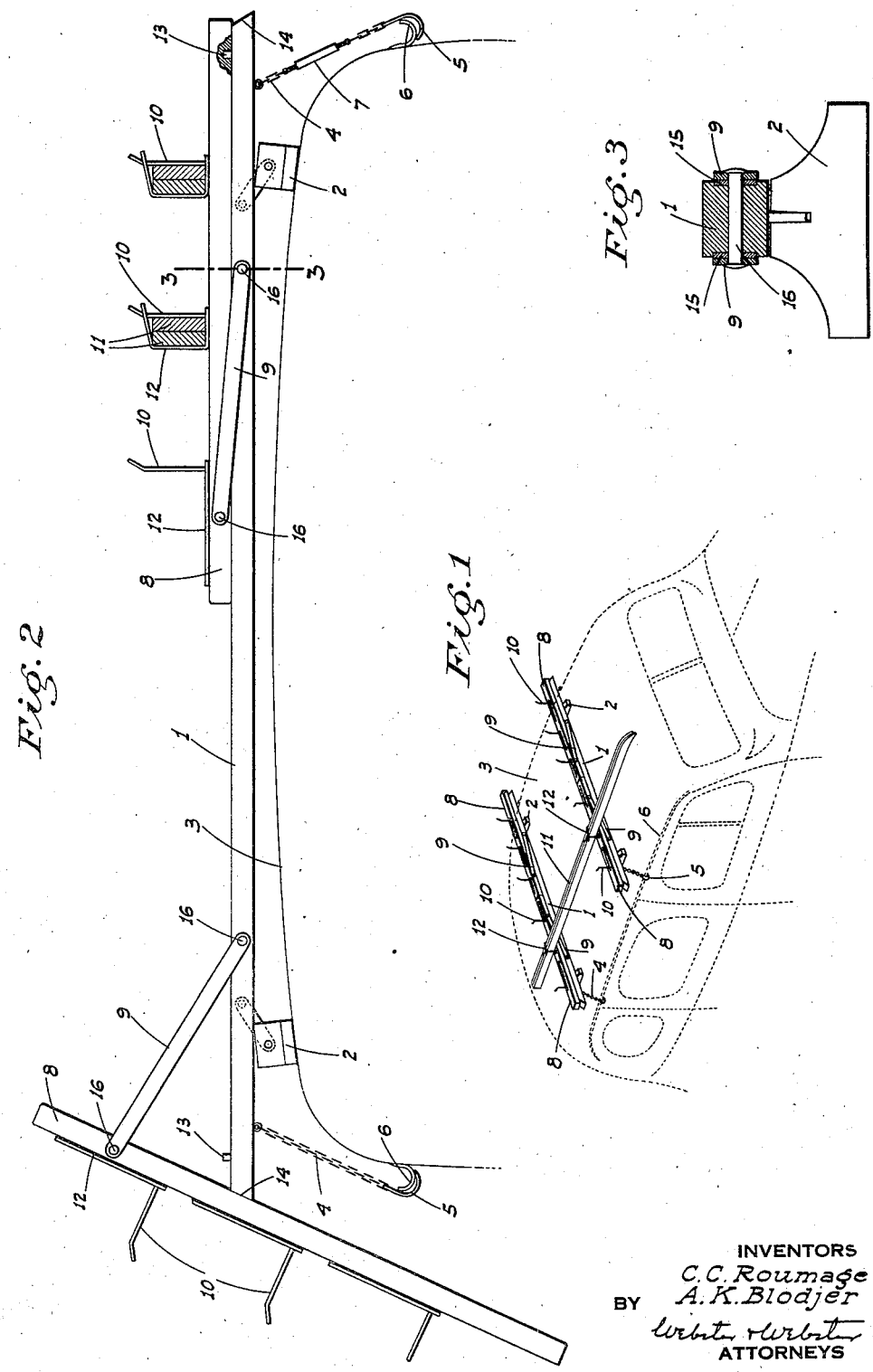
INVENTORS
C. C. Roumage
A. K. Blodjer
BY
ATTORNEYS May 11, 1943.    C. C. ROUMAGE ET AL    2,318,971
SKI RACK FOR MOTOR VEHICLES
Filed April 13, 1940    2 Sheets-Sheet 2
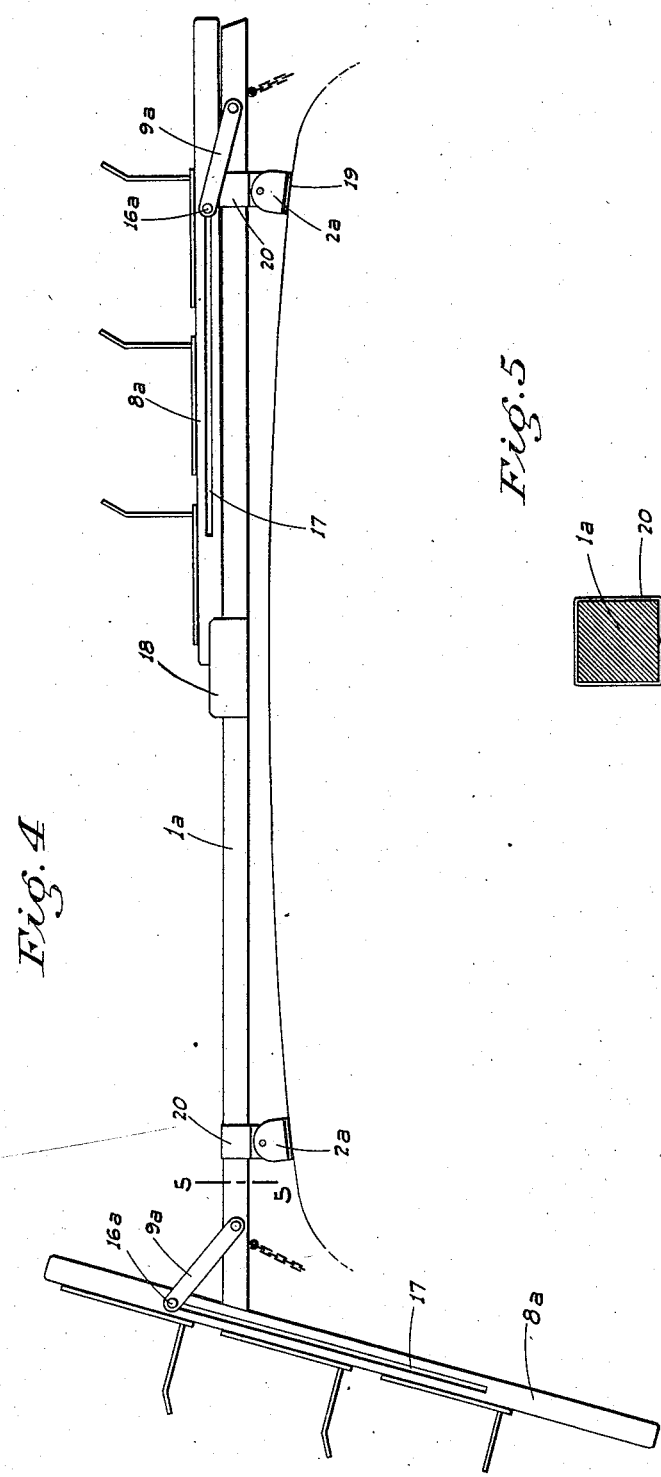
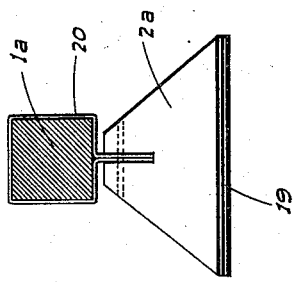
INVENTORS
C. C. Roumage
A. K. Blodjer
ATTORNEYS Patented May 11, 1943

2,318,971

UNITED STATES PATENT OFFICE 2,318,971

SKI RACK FOR MOTOR VEHICLES

Camille C. Roumage and Andrew K. Blodjer, Auburn, Calif.; said Roumage assignor to said Blodjer Application April 13, 1940, Serial No. 329,500

3 Claims. (Cl. 224—29)

This invention relates to carriers or racks for skis and similar long articles, and particularly to a device of this character adapted to be mounted on the top of a motor vehicle.

The principal object of our invention is to provide a carrier for the purpose having ski supporting members so arranged that while normally they are entirely out of the way on top of the car, they can be quickly and easily lowered to the side of the car for the removal of the skis or other articles therefrom.

In this manner, it is unnecessary for the user to stretch or have to stand on a box or the like in order to reach over the roof of the car to place his skis in position on the carrier.

Another object is to provide a carrier structure which may be easily and quickly mounted on any modern motor passenger vehicle of the closed type.

A further object is to provide a carrier which may hold a number of pairs of skis, each pair being held so that it may be removed or replaced without disturbing the remainder.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a fragmentary perspective outline of a motor vericle of the sedan type, showing our improved ski carrier mounted thereon.

Figure 2 is an elevation of one unit of the preferred form of the carrier as mounted on the vehicle and with one carrier member lowered for placement or removal of the skis thereon.

Figure 3 is a fragmentary enlarged cross section on line 3—3 of Fig. 2.

Figure 4 is an elevation, similar to Fig. 2, showing a modified form of carrier unit.

Figure 5 is an enlarged cross section on line 5—5 of Fig. 4.

Referring now more particularly to the characters of reference on the drawings, and particularly at present to the structure shown in Figs. 1 to 3, the carrier as a whole comprises two separate units, each a duplicate of the other, and adapted to be independently mounted on the top of a motor vehicle in longitudinally spaced relation, as clearly shown in Fig. 1.

Each unit comprises a main mounting bar 1 of a length to extend from side to side of the body of the vehicle, and provided on its under side with a pair of spaced swivelly mounted foot blocks 2 adapted to rest on and substantially conform to the slope of the top or roof 3 of the body of a motor vehicle as shown in Fig. 2. The bar is removably but securely held in place by flexible members such as chains 4 depending from the bar adjacent its ends and having hooks 5 on their lower end adapted to engage under the usual projecting gutters 6 on the vehicle. One of the members 4 includes a turn buckle 7 so that the desired holding tension on the hooks may be obtained. Normally resting on the bar 1 are the article supporting bars 8, each substantially half the length of bars 1 and normally disposed in end to end alinement with each other. Each bar 8 is mounted in connection with bar 1 by means of a pair of links 9 pivoted in common on and straddling the bars. When bars 8 are disposed in the above named position, the links of the two bars extend from bar 1 toward each other, the links being pivoted on the bars 8 near their adjacent ends and being pivoted on bar 1 near the foot blocks 2.

Rods 10 or similar rigid elements project upwardly from each bar 8 in spaced relation along the same and against which the skis 11 may rest, the skis being placed broadside against the rods and being held thereagainst by flexible straps 12 or the like mounted in connection with the rods and adapted to surround the skis adjacent the rods as shown.

The two units of the carrier are of course spaced apart on the vehicle a distance less than the length of the skis, as shown in Fig. 1.

In order to load the carrier or remove the skis therefrom, it is only necessary for the operator to reach up and grasp the adjacent end of a bar 8 on one side or the other of the vehicle. He then lifts said bar sufficient to release it from the locating dowel 13 preferably mounted on the bar 1 near its outer end, and then pulls forwardly on said bar 8. This causes the links 9 to swing, reversing their position relative to the transverse plane of the vehicle and enabling the bar 8 to be gradually lowered past the outer end of bar 1. Bar 8 finally comes to rest against said end, which is beveled as at 14 so that the bar 8 cannot hang actually straight down, where it might contact and scrape the body finish of the vehicle. Also, the length of links 9 relative to the distance from the beveled end of bar 1 to the point of pivot connection of the links therewith is such as to prevent the links and the bar 8 from being lowered entirely below and becoming disengaged from bar 1. The bars 8 in their lowered position are therefore handy for the placing or removal of the skis without any stretching or other awkward and unhandy operations being necessary.

The bars are preferably of wood while the links are of metal, and in order to prevent abrasion of the wood by the swinging links, substantially countersunk metal washers 15 are mounted in the bars about the pivot pins 16 of the links, as shown in Fig. 3.

In the structure of Figs. 4 and 5, the same advantages as to ease and convenience of operation are retained.

In this case however, the links 9a which connect the bars 1a and 8a are relatively short, and are near the outer ends of bar 1a, and instead of being secured on the bars 8a at a fixed point in their length, the connecting pivot pins 16a of the links slide in longitudinal slots 17 formed in bars 8a. The lowering movement of bars 8a is then preceded by a horizontal sliding movement until the pins 16a reach the far end of slots 17, after which the links and bars 8a will swing to bring the bars to the desired lowered position, as shown at the left-hand side of Fig. 4. In this structure, the dowels may be omitted, and their place taken by upstanding centrally disposed guide strips 18 on bar 1a, so as to prevent the relatively unmounted ends of bars 8a, when resting on bar 1a, from possible lateral deflection.

The foot blocks 2a, which are faced with rubber 19 or the like, are swively mounted on metal sleeves 20 having a sliding fit on bar 1a beyond the connection of links 9a therewith, so that said blocks may be easily shifted to conform to different car top widths and contours.

It may here be remarked that while we have particularly designed our carrier for use with skis, since it will serve to carry fishing poles, long-handled tools of various kinds, surveyors' tripods and leveling rods, and other articles of similar form.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. An article carrying rack for a motor vehicle top, comprising a main bar adapted to overlie the top from adjacent one edge thereof, means to secure the main bar in position, an article supporting bar normally disposed parallel to and resting on the main bar from adjacent an outer end of the latter, parallel links between which said bars engage, said links normally sloping upwardly and rearwardly, lower pivots between the links and said main bar, and upper pivots between the links and said supporting bar; said links maintaining the bars against relative lateral displacement, and the distance from the lower pivots to said outer end of the main bar being greater than the length of the links to such extent that when the supporting bar is pulled outward and lowered, and said links reverse to upwardly and outwardly sloping position, said outer end of the main bar abuts the supporting bar below said upper pivots, whereby said links cannot swing downward beyond dead center, limiting lowering movement of the depending supporting arm and maintaining the same outwardly short of perpendicular.

2. A device as in claim 1 in which the normally engaged surfaces of said bars are flat; said outer end of the main bar being beveled for matching engagement with the adjacent surface of the supporting bar when the latter is in lowered position.

3. An article carrying rack for a motor vehicle top, comprising a main bar adapted to overlie the top from adjacent one edge thereof, means to secure the main bar in position, an article supporting bar normally disposed parallel to and resting on the main bar from adjacent an outer end of the latter, parallel links between which said bars engage, said links normally sloping upwardly and rearwardly, lower pivots between the links and said main bar, and upper pivots between the links and said supporting bar; one of said bars intermediate its ends having a longitudinal slot in which the corresponding link pivots ride and the links being of such length at upon outward and lowering movement of the supporting bar, said corresponding link pivots engage in one end of said slot and the links maintain said depending supporting bar in abutting relation to said outer end of the main bar and outwardly short of perpendicular.

CAMILLE C. ROUMAGE.
ANDREW K. BLODJER.